May 19, 1959
S. B. DUNHAM
2,887,227
DUST PARTICLE COUNTING APPARATUS
Filed Dec. 27, 1955
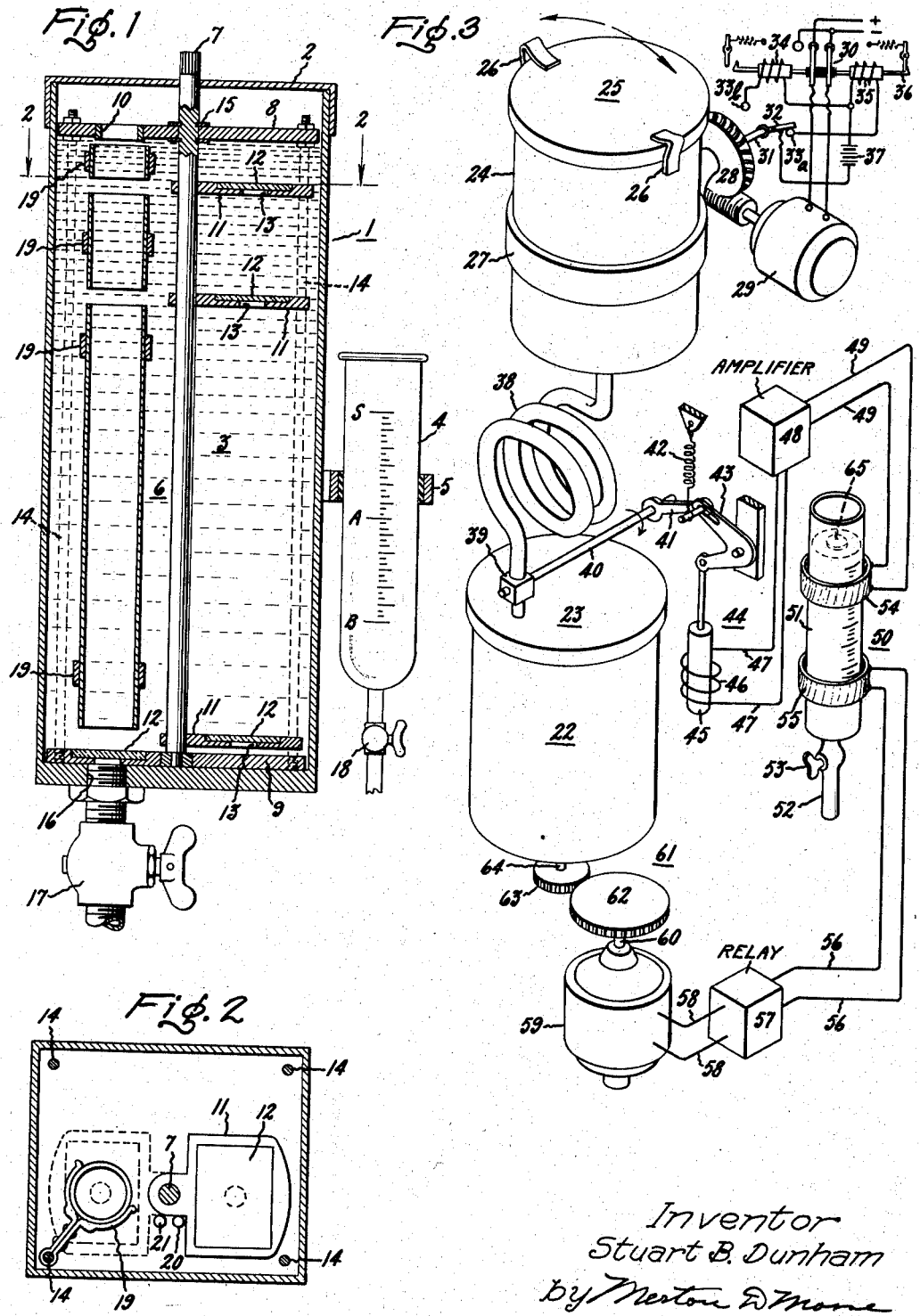
Inventor
Stuart B. Dunham
by Merton D. Moore
His Attorney United States Patent Office 2,887,227
Patented May 19, 1959

2,887,227

DUST PARTICLE COUNTING APPARATUS

Stuart B. Dunham, Schenectady, N.Y., assignor to General Electric Company, a corporation of New York Application December 27, 1955, Serial No. 555,416

11 Claims. (Cl. 209—209)

This invention relates to an apparatus and a method of separating particles of powdered material in the submillimeter range according to their size. More specifically, this invention relates to an apparatus which separates the particles of different size by utilizing their differential settling rates through a liquid settling medium.

In many industrial areas, a knowledge of the particle size distribution of powdered or finely divided material is of great significance. Mechanical and surface chemical properties of many substances may often depend on the constituent particle sizes. For example, in the ceramics field the workability, and to some extent the character of the final product, is governed by the fineness of the cement, clay, and other particles constituting the material. Similarly, in the powdered metallurgy field the relative proportions of particles of different size will determine mechanical characteristics, such as tensile strength and density. In dealing with problems of fuel contamination, it is often quite necessary to know the particle size distribution of the contaminant in the fuel. Thus, in all of these divergent industrial areas, an accurate means for determining the sizes of powdered particles is of great value. One means for achieving this is to utilize the principles of Stokes' law.

It is well known that small particles, when placed in a liquid medium, will settle through the medium at a velocity which is a function of their size. In accordance with Stokes' law, the larger particles will acquire a greater relative velocity in the settling medium as compared to the smaller particles. Thus, finer particles moving at a lesser velocity will be progressively separated from larger particles. If a sufficient distance of fall is permitted in the settling medium, there will be a classification of the particles according to size.

In the prior art, there have been various systems for separating particles in the submillimeter range which have utilized the principle of the differential settling rate in a liquid settling medium. All of these prior art methods and devices have, however, been relatively inaccurate and very lengthy and tedious in performance.

One of the prior art methods which proved unsatisfactory involved placing the particles in the liquid settling medium and stirring the settling medium thoroughly to achieve a homogeneous distribution. The particles would then be allowed to settle through the liquid settling medium. The separation of the particles achieved by this method was extremely inaccurate inasmuch as all of the particles did not start the settling process from the same level in the liquid. That is, some of the smaller particles would not be separated from the larger particles, even though they moved at a lesser velocity than the larger particles, inasmuch as they initially started from a lower level in the liquid than the larger particles. As a result, in this method any data would have to be corrected by subtracting therefrom all particles smaller than a given size. Such a method was, of course, very tedious and lengthy and, in addition, tended to multiply errors and reduce accuracy.

Another prior art method which failed to provide the required accuracy involved suspending the particles in a liquid medium having the same density as the settling medium and depositing this mixture on the surface of the settling medium. This method proved inaccurate due to the fact that the suspending medium was of the same density as the settling medium. That is, when the suspending medium was deposited on the surface of the settling medium, it had a tendency, due to inertia effects, to plunge through the surface of the settling medium. As a result of this plunging action, circulating currents would be set up in the settling medium, causing the particles to be dispersed in height before the settling process began. With the particles dispersed in height, it can be seen that errors would be introduced since again small particles, even though of less velocity, would be intermixed with with the larger particles due to the original height dispersion.

Yet another prior art technique involved placing dry powdered particles on the surface of the settling medium. This method also introduced inaccuracies because the rate of wetting and penetration of the liquid surface by the particles was random and could not be adequately controlled. As a result, not all of the particles started the settling process through the liquid at the same time.

An object of this invention, therefore, is to provide a Stokes' law particle separator in which all of the particles begin the settling process in the settling medium from the same level and at the same time.

Another object of this invention is to provide a Stokes' law apparatus for determining particle sizes in which the suspending and settling media are of different densities.

A further object of this invention is to provide a Stokes' law particle separator which uses timing means to indicate the distance the particles of different size have fallen and collecting means which intercept the particles separated according to size.

Still another object of this invention is to provide an apparatus for separating and counting particles in the submillimeter range in which spreading of the particles on the surface of the settling liquid is prevented by the use of a starting cylinder located at the surface of the settling liquids.

Yet another object of this invention is to provide an apparatus for separating and counting particles in the submillimeter range in which the settling process and the collection of the particles is automatically controlled from a timing means.

Briefly stated, according to one form of this invention, the particles of the powdered material are separated according to size by depositing the dust particles in solution on the surface of a liquid settling medium and permitting the particles to fall through that medium. The powdered material is suspended in a suspending medium having a density which is less than that of the settling medium. Thus, there is assurance that all of the particles will start settling simultaneously from the surface of the settling medium. After the settling process has begun, the particles will be classified according to size in the settling medium since the relative velocity of the particles depends on their size. After a given period of time, the now separated particles are intercepted by means of rotatable collecting plates.

In another form of my invention, I provide an apparatus in which the settling process is initiated automatically by a timing means, and the collection of the separated particles is also initiated by this same timing means. The timing means is a burette filled with a liquid of the same density as found in the settling chamber. The timing burette contains an upper liquid level responsive device which puts out an electrical control signal when the liquid in the burette has reached a first level. A valve is operated in response to the control signal and deposits the dust particles suspended in a suspending medium upon the surface of the settling medium. The timing burette also contains a second liquid level responsive means which puts out an electrical control signal when the liquid reaches a second level and causes the collecting plates within the settling chamber to be rotated to intercept the separated particles. The flow of the liquid out of the burette is proportional to the fall of the particles within the settling chamber since both are a function of liquid viscosity. The liquid level in the burette thus indicates the distance the particles have fallen through the settling medium and is utilized to initiate the collection of the separated particles.

The features of this invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a schematic view of a settling chamber constructed in accordance with my invention;

Fig. 2 is a sectional view of the apparatus of Fig. 1 along the line 2—2;

Fig. 3, a perspective view of another form of my invention in which admission of the suspending fluid and rotation of the collecting stages is automatically controlled from a timing burette.

Stokes' law, which has been referred to previously, indicates that, in settling through a liquid medium, large particles will acquire a greater relative velocity as compared to small particles once a constant velocity has been reached in accordance with the formula:

$$V = \frac{2gd^2(D_P - D_L)}{9n}$$

$V$ = Velocity
$g$ = Gravitational constant
$d$ = Diameter of particle
$D_P$ = Density of particle
$D_L$ = Density of liquid
$n$ = Viscosity of liquid Finer particles moving at a lesser velocity will be progressively separated from larger particles. If a sufficient distance of fall is permitted, there will be a separation of the particles according to size, with the heavier particles forming the lower-most layer falling through the liquid with progressively finer layers above that.

The rate at which a liquid flows through the capillary portion of a timing burette is a function of the viscosity of the liquid. The rate of fall of particles through a settling liquid is, according to Stokes' law, among other things, a function of the viscosity of the settling liquid. By filling the timing burette with the same liquid as that through which the particles settle, it can be seen that the rate at which the liquid flows out of the timing burette will give an indication proportional to the rate at which the particles are falling through the settling liquid and may, therefore, be utilized as a timing means to indicate when to intercept the particles which have been separated into given size groups.

The invention will be most readily understood by reference to Fig. 1 of the drawing in which the apparatus for separating particles according to their size is illustrated. A settling receptacle is provided for holding the liquid settling medium, which in the arrangement illustrated in Fig. 1 is shown as a four-sided tank 1. Any other suitable configuration for the container may, of course, be used. A dust cap 2 fits over the tank and prevents dust in the atmosphere from entering, as well as preventing evaporation of the liquid settling medium during the settling process. Within the settling tank 1, a means is provided for collecting the particles of the powdered material once they have become separated. A collecting stage holder assembly 3, which may be removed from the settling tank, is mounted in the settling tank 1. The collecting stage holder assembly comprises a top plate 8 and a bottom plate 9 rigidly supported at their corners by four separator rods 14. A collecting stage holder shaft 7 is rotatably mounted in the bottom plate 9 by means of a bearing and in the upper plate 8 by means of the snap ring 15. Collecting stages 11 are attached to and spaced along the stage holder shaft 7 and are rotatable thereby to intercept the separated particles. Each of the collecting stages 11 has a recessed portion for receiving a microscope slide 12. A push hole 13 extends through each of the stages 11 and connects with the recessed portion to permit removal of the microscope slides 12.

A means for preventing the spread of the powdered particles over the whole surface of the liquid settling medium is also provided, comprising a short cylindrical member 10 mounted in the top plate 8 of the assembly. Mounted directly beneath the starting cylinder 10 is a vertical settling column 6 having transverse slots spaced along the axial length thereof. The settling column 6 is supported by means of clamps 19 which are connected to the separator rods 14. The bottom plate 9 also contains a recessed portion directly beneath the settling column 6 to receive a microscope slide 12 which will collect all particles larger than a given size. A drain hole 16 in the bottom of the settling tank 1 in conjunction with a stop cock 17 provides for draining of the settling fluid from the settling tank.

A timing means consisting of a timing burette 4 having a main body which tapers down to a capillary portion may be attached to the settling tank by means of the support 5. The flow of liquid out of the capillary is controlled by means of a valve 18 located in the capillary. The main body portion of the burette has inscribed thereon several timing marks. An upper starting mark S for starting the settling process when the liquid has reached that level and two lower timing marks A and B which, as will be explained in greater detail later, indicate different particle size groupings and are utilized to determine when the collecting stages 11 are rotated.

Fig. 2, which is a sectional view taken along the lines 2—2 of Fig. 1, shows a plan view of a collecting stage 11 and the microscope slide 12 mounted within the settling tank 1. A stop member 20 limits travel of the collecting stage 11 in the non-intercepting position, while a stop member 21 limits travel in the intercepting position, which is shown by means of dashed lines.

It may be desirable that the settling tank 1 be disposed inside of a larger tank filled with water so as to maintain a relatively constant temperature in the settling fluid and prevent thermal currents, with their consequent introduction of errors, in the settling medium.

In order to insure accuracy, it is necessary that the liquid in which the powdered material is suspended be of a density which is less than that of the settling medium, as well as being miscible therewith. Thus, when the suspending medium and the powdered particles contained therein are introduced onto the surface of the settling medium, no plunging, due to inertia effects, occurs to cause dispersion of the particles in height. It has been found that insofar as the density and miscibility requirements are concerned, the choice of kerosene as the suspending medium and of benzol as the settling medium provides excellent results. However, due to the relatively high toxicity of benzol, another medium may be preferred. An adequate substitute for benzol as a settling medium may comprise a mixture of kerosene with approximately fifty percent of trichlorethylene. The suspending medium utilized would still be kerosene.

In utilizing the apparatus, the settling chamber 1 is filled with a liquid settling medium consisting of a mixture of 50 percent kerosene and 50 percent trichlorethylene. The collecting stage holder assembly 3 is placed within the settling tank 1. The apparatus is permitted to stand until all currents in the settling liquid have died out. The timing burette 4 is filled with the same mixture of kerosene and trichlorethylene to a level somewhat higher than the starting mark S on the burette. The lower tip of the burette is then opened and the liquid is permitted to run off. When the level of the liquid in the burette reaches the mark S, the suspending mixture, which is a mixture of kerosene and a powdered material, is poured into the starting cylinder 10, thus permitting the start of the settling process. When the liquid level in the burette reaches either the lower timing mark A or B, depending which particle size grouping is desired, the movable collecting plates 11 are inserted into the slots of the settling column 6 by manipulating the rotatable stage holder shaft 7. The separated particles will thus be deposited upon the microscope slide 12 mounted in the recessed portion of the collecting stages 11. The collecting stage holder assembly 3 is withdrawn from the settling chamber 1 at a later time and the microscope slides 12 are removed with the assistance of the push holes 13. The number of particles found on each of these microscope slides are then counted, and it can be determined how many particles in each size range the powdered material contained.

The timing burette 4, as pointed out previously, has etched upon its surface several timing marks: a starting mark S at the top of the burette, and two lower timing marks A and B found on the lower part of the burette. The upper mark A corresponds to the separation of the particle into four size groups of one category, while the lower mark B would indicate separation into four size groups of another category.

For example, timing mark A could correspond to separation into four size groups—above 40 microns, 20 to 40 microns, 10 to 20 microns, below 10 microns—while timing mark B could correspond to separation into the groups—above 20 microns, 10 to 20 microns, 5 to 10 microns, and below 5 microns. Thus, it can be seen that a number of these lower timing marks may be utilized to indicate various degrees of separation of the particles into different size categories.

It is possible by means of the formula expressing Stokes' law to calculate the spacing between the collecting plates 11 of the collecting stage holder assembly so that these collecting plates intercept all particles falling within a given size range. That is, knowing the particle size classification that is desired, it is possible by means of this formula to determine the velocity of each of the particle groups since the density and viscosity of the settling liquid is known as well as the density of the particles. Knowing the velocity of fall of each of the size groups, it is possible to determine how far each of these size groups will have fallen at the end of a given period of time. Thus, it is possible to space the collecting plates at such a distance that the required size groups are intercepted at the end of a given time period.

In another form of my invention, the admission of the suspending medium into the settling tank, as well as the rotation of the collection plates into the intercepting position, is controlled automatically from a timing means of the burette type and may be most readily understood by reference to Fig. 3.

Referring now to Fig. 3, there is shown a settling tank 22 of the same type as that shown in Fig. 1. A liquid tight dust cap 23 fits over the settling tank to prevent introduction of dust particles from the surrounding atmosphere, as well as to prevent evaporation of the liquid settling medium. The dust cap 23 has a small opening therein into which is introduced one end of a coiled flexible rubber coupling hose 38. The other end of the coupling home 38 is attached to a suspension medium receptacle which is shown as a storage container 24 which holds a mixture of the suspending medium and the powdered material. A valve 39 is contained in the coupling hose 38 to control the admission of the suspending fluid into the settling chamber 22. The storage tank 24 is covered by a liquid tight dust cap 25 which is fastened securely to the storage tank by means of clamps 26 to prevent the dust cap from falling off. Means for oscillating the storage tank is provided in order to keep the mixture of the suspending fluid and the powdered material thoroughly mixed. The oscillating means include a circular mounting bracket 27 which is fastened to a worm and worm gear arrangement 28 driven by a reversible D.C. motor 29. The direction of rotation of the motor 29 is controlled by means of the reversing switch 30.

It is preferred that the storage tank 24 be oscillated through an angle of 180 degrees so as to keep the powdered particles homogeneously dispersed within the suspending fluid.

In order to prevent the storage chamber 24 from being oscillated through a larger angle than is desired, a limit switch system is provided to reverse the direction of movement when the chamber 24 reaches the furthest permissible position. A shaft 31 is attached to the gear of the worm gear arrangement 28 and rotates therewith to reproduce movements of the chamber 24. Mounted on the end of the shaft 31 is a rotatable switch member 32 which is insulated from the shaft 31 and is permanently connected to the negative terminal of a source of D.C. voltage 37. A pair of contacts 33a and 33b constitute terminals between which the rotatable switch member moves. Terminal 33a is connected to one end of a solenoid coil 35, the other end of which is connected to the positive terminal of the D.C. voltage source 37. Terminal 33b is connected to one end of a second solenoid 34, the other end of which is also connected to the positive terminal of the D.C. voltage source 37. The solenoids are mounted concentrically about an elongated core member 36 which also insulatingly supports the reversing switch 30. The movement of the rotatable switch 32 between the terminals 33a and 33b alternately energizes the solenoids 34 and 35, causing the core member 36 to be moved to the right or left. Movement of the core member 36 moves the reversing switch 30 mounted thereon and reverses the voltage applied to the motor 29 and, consequently, its direction of rotation. The position of terminals 33a and 33b are such that they represent the maximum permissible excursions of the storage chamber 24. That is, when the chamber 24 reaches the 0 degree position, the switch 32 makes electrical connection with one of the terminals to energize one of the solenoids to operate the reversing switch 30. This reverses the direction of rotation of the motor 29 and, in turn, the direction of movement of the chamber 24. When the chamber reaches the 180 degree position, the other solenoid is energized in a similar fashion to again reverse the direction of movement of the chamber. Thus, the chamber is oscillated continuously while at the same time the extent of travel is limited to a predetermined value. Any other suitable limit switch arrangement to prevent the chamber from oscillating through an angle greater than 180 degrees may, of course, be utilized, there being available an extensive literature on the subject.

A control means is provided for operating the valve 39 in response to a timing means to provide for the controlled admission of the suspending fluid into the settling chamber. This control means also encompasses apparatus for rotating the collecting stages in response to the timing means. One end of a control shaft 40 is coupled to the valve 39 and functions to open and close said valve. The shaft 40 is attached at its other end to a movable arm 41. The other end of the movable arm 41 is pivotably fixed to one arm of a bell crank 43. In addition, a resilient spring 42 is fastened to the arm 41 to urge it in one direction while movement of the bell crank 43 will urge it in the opposite direction. Movement of the bell crank 43 and, in turn, the valve control shaft 40, is controlled by a relay 44 having a core member 45, which is coupled to the other arm of the bell crank 43, and an exciting coil 46 which moves the core member 45. The coil 46 is connected by means of leads 47 to the output of an amplifier 48. Leads 49 are connected to the input of the amplifier to provide an electrical control signal from a timing means. It is to be understood, of course, that an inductance bridge of which the timing means control signal generating means is the variable arm may be utilized to provide an input signal to the amplifier 48. In order to simplify both the drawing and the description, the exact structural details of the amplifier and bridge have not been shown since both of these are old and well known, both as to structure and manner of use.

A timing means is also provided to operate the relay 44 and, in turn, the valve 39, to permit the insertion of the suspending fluid into the settling tank to start the settling and separating process. This timing means comprises a liquid filled, calibrated timing burette 50 having a main body 51 which tapers down to a capillary portion 52. A valve 53 is located at the tip of the capillary portion in order to control flow of liquid therethrough. A magnetic member 65 embedded in a material such as cork to make it float is contained in the burette 50. Surrounding the main body portion 51 of the timing burette 50 are two liquid level responsive indicators of the magnetic float type. The upper liquid level responsive indicator comprises an inductance coil 54 mounted concentrically about the main body 51 of the burette. Leads 49 connect the coil 54 to the bridge-amplifier 48. The lower liquid level indicator comprises a second inductance coil 55, having leads 56, disposed concentrically about the lower portion of the main body 51 of the timing burette. Leads 56 are connected to an amplifier and relay 57 which operates to connect a source of power, not shown, to the power leads 58 of a small fractional horsepower motor 59. The motor 59, when energized, drives a shaft 60 which is connected to the gear 62 of the gear train 61. The gear 62 is meshed with a second gear 63 and imparts motion thereto to drive a shaft 64 which turns the collecting plates within the settling tank 22 so as to bring these plates into the particle intercepting position. Although a liquid level device of the magnetic float type has been shown and described, it is to be understood that other liquid level responsive means may be, of course, utilized. For example, phototube or electrical conductivity devices are perfectly satisfactory substitutes.

In employing the apparatus of Fig. 3, the settling tank 22 is filled with the settling liquid and the storage tank 24 is filled with the suspending medium having the powdered material dispensed therein. The valve 39 in the flexible coupling hose is kept closed so that none of the suspending medium is permitted to enter the settling tank. The storage tank is oscillated by the motor driven worm and worm gear arrangement so as to keep the powdered material well dispersed within the suspending medium. The timing burette 50 is filled with the same liquid as is found in the settling tank 22 and the magnetic float device 65 which is embedded in a material, such as cork, to make it float on the surface of the liquid is inserted therein. The initial level of the liquid in the timing burette is above the upper lever indicator coil 54. The valve 53 in the capillary portion 52 on the timing burette is then opened and the liquid is permitted to flow out at a rate proportional to its viscosity. When the level of the liquid in the burette reaches the level of the coil 54, the magnetic element 65 is in the field of the coil and causes an electrical signal to be produced thereby which is applied to the bridge-amplifier 48 by means of the leads 49. This electrical signal energizes the exciting coil 46 of the relay 44 and pulls the core member 45 down. This downward movement is transferred to the bell crank 43 and translated into a rotational movement thereof. The movement of the bell crank 43 pulls the arm 41 in a direction opposite to that in which it is urged by the resilient spring member 42. The valve shaft 40, which is connected to the arm 41, is normally in a position to keep the valve 39 closed due to the action of the resilient spring 42 on the arm 41. Upon movement of the bell crank 42, the arm 41 is urged into a downward position against the spring 42 and rotates the shaft 40 to open the valve 39 and introduce the suspending medium and the powdered material therein into the settling tank. As the liquid level in the timing burette continues to fall, the magnetic float member 65 passes out of the field of the upper liquid level coil 54 which eliminates the control signal produced thereby, de-energizes the relay 44 which terminates the force applied to the bell crank 43 and, in turn, the arm 41. The force opposing the resilient spring 42 having been removed, the spring pulls the arm 41 upward and rotates the valve shaft 40 back into its normal position and closes the valve 39.

When the liquid level of the burette reaches the lower liquid level coil 55, the magnetic float member 65 enters its field and causes an electrical control signal to be produced thereby which is transmitted by means of the leads 56 to the amplifier and the relay 57 to cause the latter to become energized. The energization of relay 57 connects a source of power, not shown, to the motor 59 by means of the leads 58. The motor drive shaft 60 couples the rotation of the motor 59 to the gear train 61 and, in turn, to the shaft 64 which causes rotation of the collecting stages into the path of the falling particles to intercept these particles which by now have been separated into the various size groups. The control signal provided by the lower coil 55 is terminated when the liquid level and the magnetic member 65 floating thereon falls below the level of the coil. The relay 57 is then de-energized which, in turn, de-energizes the motor 59, and no further motion is transmited to the collecting stage rotating shaft 64. The collecting stage assembly may be removed from the settling tank 22 in order to observe and count the number of particles of each size range.

While the preferred embodiment of Fig. 3 shows the settling and storage chambers of like size and separately mounted, in many applications the storage chamber for the suspending medium is much smaller than the settling chamber. As a result, it may be feasible in many instances to mount the storage chamber and its associated valves and brackets within the upper portion of the settling chamber. This alternative method of mounting the suspending medium storage chamber would necessitate bringing the valve control shaft and the shaft imparting oscillatory motion to the mounting bracket out through the side of the settling chamber.

It is also possible by mechanically interlocking the timing burette valve and the suspending medium chamber valve to eliminate the upper liquid level responsive coil. That is, the timing burette is filled to the starting mark S and the valve in the capillary portion of the burette is opened. By virtue of the mechanical interlock, the suspending medium chamber valve is also opened, depositing the suspending medium on the surface of the settling medium to start operation of the apparatus. It is obvious that no upper liquid level responsive device is necessary in this modification.

In the specific embodiment illustrated, the particle collecting means has been shown as comprising rotatable spaced parallel plates. It is possible, however, to use an alternative means which does not utilize a multiple number of parallel spaced plates. For example, it would be quite feasible to collect the separated particles by sequentially inserting at the bottom of the settling tank collecting plates at time periods when the separated particles of different size groups reach the bottom of the settling tank.

While I have shown a particular embodiment of my invention, it will, of course, be understood that I am not limited thereto since many modifications of the apparatus may be made. I contemplate by the appended claims to cover any such modifications as fall within the true spirit and scope of my invention.

What I claim as new and desire to secure by Letters Patent of the United States is:

1. An apparatus for separating particles of powdered material according to size, comprising an outer settling chamber for holding a liquid settling medium, a settling column within the setting chamber having axially spaced transverse slots, movable spaced particle collecting members adapted for insertion into said slots mounted on a common support member, a cylindrical starting member fastened to said support member into which a mixture of powdered material and a liquid suspending medium is poured to initiate the separation, said cylinder being coaxial with and positioned above said column, the spacing of said slots and collecting members being such that said members collect groups of different sized particles which have been separated due to their differential settling rates in the settling medium.

2. A method of separating particles of powdered material according to size, comprising the steps of mixing a quantity of the powdered material in a liquid suspending medium of one density to form a homogeneous mixture, placing the mixture on the surface of a liquid settling medium of a different density, intercepting the particles in the liquid settling medium at a subsequent time when the particles have been segregated according to size due to their differential settling rates in the liquid settling medium.

3. A method of separating particles of powdered material according to size, comprising the steps of mixing a quantity of the powdered material in a liquid suspending medium of one density to form a homogeneous mixture, pouring the mixture on the surface of a liquid settling medium having a higher density than said suspending medium, intercepting the settling particles at a later time when the particles have been segregated according to size due to their differential settling rates in the liquid settling medium.

4. A method of separating particles of powdered material according to size, comprising the steps of mixing a quantity of the powdered material in a kerosene suspending medium to form a homogeneous mixture, pouring the mixture on the surface of a benzol settling medium, intercepting the settling particles at a later time when the particles have been segregated according to size due to their differential settling rates in the settling medium.

5. A method of separating particles of powdered material according to size, comprising the steps of mixing a quantity of the powdered material in a kerosene suspending medium to form a homogeneous mixture, pouring the mixture on the surface of a settling medium comprising a mixture of substantially 50 percent kerosene and substantially 50 percent trichlorethylene, and having a higher density than said suspending medium, intercepting the settling particles at a later time when the particles have been segregated according to size due to their differential settling rates in the settling medium.

6. An apparatus for separating particles of powdered material according to size, comprising a storage receptacle for holding a mixture of the powdered material and a liquid medium of a given density, a settling means including a chamber for holding a liquid settling medium of a different density, a slotted settling column within said chamber, and movable collecting means adapted for insertion into said slotted settling column to intercept the separated particles, means connecting said storage receptacle and said settling means to admit said mixture into said settling means.

7. An apparatus for separating particles of powdered material based on the differential settling rates of the particles, comprising a settling chamber for holding a liquid settling medium of one density, a settling column located within said chamber and having axially spaced transverse slots, movable spaced particle collecting members adapted for insertion into said slots and mounted on a common support member, a cylindrical starting member coaxial with and mounted above said settling column, a suspension receptacle for holding a liquid suspension medium having powdered material dispersed therein, the suspension liquid being of lower density than said settling liquid, means connecting said settling chamber and said suspension receptacle to admit said liquid suspension medium into said settling chamber, and means for oscillating said suspension receptacle so as to keep the powdered material well dispersed in the suspension liquid.

8. An apparatus for separating particles of powdered material according to size which depends on the differential setting rates of the particles in a liquid medium, comprising a settling container for receiving a liquid settling medium, a storage container for receiving a liquid suspending medium having powdered material dispersed therein, means connecting said storage and settling containers to introduce said suspending medium into said settling container, a settling column within said settling container, said column having axially spaced transverse slots, spaced movable collecting plates insertable into said slots for intercepting separated particles, control means, including timing means, for operating on said connecting means to cause said suspending medium to be introduced into said settling container and operative subsequently to move said collecting means to intercept the separated particles.

9. The apparatus of claim 8, in which said timing means comprises a burette filled with the same liquid as the settling chamber.

10. An apparatus for separating particles of powdered material according to size, comprising a settling receptacle for holding a liquid settling medium, a storage receptacle for receiving a liquid suspending medium having powdered material dispersed therein, connection means between said storage and settling receptacles, valve means associated with said connection means for controlling the admission of the suspending medium into the settling receptacle, spaced movable collecting means for intercepting the separated particles, control means, including a timing burette filled with the same liquid as the said settling receptacle, for controlling said valve means and said movable collecting means, a first liquid level responsive device associated with said burette to operate said valve means when the liquid in said burette reaches a given level, a second liquid level responsive device associated with said burette to operate said movable collecting means when the liquid in the burette reaches a second level.

11. The apparatus of claim 10 in which the liquid level responsive device is a magnetic float device.

References Cited in the file of this patent

UNITED STATES PATENTS

| | | |
|---|---|---|
| 517,974 | Doerflinger | Apr. 10, 1894 |
| 558,213 | Shedlock | Apr. 14, 1896 |
| 1,296,737 | Baring Gould | Mar. 11, 1919 |
| 2,305,020 | Mau | Dec. 15, 1942 |